United States Patent
Price

(10) Patent No.: US 8,964,007 B2
(45) Date of Patent: Feb. 24, 2015

(54) FRAME SYSTEM, METHOD AND APPARATUS FOR SYNCHRONIZING THREE-DIMENSIONAL EYEWEAR

(75) Inventor: William Pat Price, Keller, TX (US)

(73) Assignee: Vizio, Inc., Irvine, CA (US)

( * ) Notice: Subject to any disclaimer, the term of this patent is extended or adjusted under 35 U.S.C. 154(b) by 730 days.

(21) Appl. No.: 12/697,312

(22) Filed: Feb. 1, 2010

(65) Prior Publication Data

US 2011/0187838 A1     Aug. 4, 2011

(51) Int. Cl.
*H04N 13/04*     (2006.01)
(52) U.S. Cl.
CPC .................. *H04N 13/04* (2013.01)
USPC .............. 348/53; 348/42; 348/43; 348/56; 348/60
(58) Field of Classification Search
USPC ............... 348/43, 53, 56, 500, E13; 349/15
IPC .................................... H04N 13/04
See application file for complete search history.

(56) References Cited

U.S. PATENT DOCUMENTS

| | | | |
|---|---|---|---|
| 2001/0028413 A1* | 10/2001 | Tropper | 349/16 |
| 2009/0051759 A1* | 2/2009 | Adkins et al. | 348/53 |
| 2009/0251531 A1* | 10/2009 | Marshall et al. | 348/42 |
| 2010/0289883 A1* | 11/2010 | Goris et al. | 348/56 |

* cited by examiner

*Primary Examiner* — Jay Patel
*Assistant Examiner* — Neil Mikeska
(74) *Attorney, Agent, or Firm* — Law Office of Scott C. Harris, Inc

(57) ABSTRACT

An application for a three-dimensional television system includes content encoded with left/right frame indicators at a pre-determined location on each frame. For example, during display frames meant for a first eye, the set of pixels contain a first pattern while during display of frames meant for the second eye, the set of pixels contain a second pattern. A detector interfaced to the screen of the television detects the left/right indication and provides synchronization to shutters of three-dimensional eyewear. The detector is positioned over the set of pixels and determines which pattern is displayed, generating a synchronization signal based upon the patterns. The synchronization signal is then transmitted to three-dimensional eyewear where it is used to control the shutters. In some embodiments, a phased-locked loop is provided within the three-dimensional eyewear to continue operation during periods when the transmission of the synchronization signal is blocked or otherwise interrupted.

18 Claims, 20 Drawing Sheets

FRAME SYSTEM, METHOD AND APPARATUS FOR SYNCHRONIZING THREE-DIMENSIONAL EYEWEAR

CROSS-REFERENCE TO RELATED APPLICATION

This application is related to U.S. patent application Ser. No. 12/697,310, filed Feb. 1, 2010, titled "PIXEL SYSTEM, METHOD AND APPARATUS FOR SYNCHRONIZING THREE-DIMENSIONAL EYEWEAR". This application is also related to U.S. patent application Ser. No. 12/697,313, filed Feb. 1, 2010 titled "PIXEL BASED THREE-DIMENSIONAL ENCODING METHOD". This application is also related to U.S. patent application Ser. No. 12/697,315, filed Feb. 1, 2010 titled "FRAME BASED THREE-DIMENSIONAL ENCODING METHOD".

FIELD

This invention relates to the field of display devices worn over an individual's eyes and more particularly to a system for synchronizing the display devices with content presented on a display screen.

BACKGROUND

There are several ways to present a three-dimensional image to a viewer of a television. The common aspect of the existing methods is to present an image or frame from two perspectives, a left-eye perspective of the content to the left eye and present an image or frame from a right-eye perspective to the right eye. This creates the proper parallax so that the viewer sees both perspectives and interprets what they are seeing as three-dimensional.

Early three-dimensional content was captured using two separate cameras aimed at the subject but slightly separate from each other providing two different perspectives. This simulates what the left eye and right eye see. The cameras simultaneously exposed two films. Using three-dimensional eyewear, the viewer looks through one film with the left eye and the other film with the right eye, thereby seeing what looks like a three-dimensional image.

Progressing to motion pictures, three-dimensional movies were produced in a similar way with two cameras, but the resulting images were color encoded into the final film. To watch the film in three-dimension, eyewear with colored filters in either eye separate the appropriate images by canceling out the filter color. This process is capable of presenting a three-dimensional movie simultaneously to a large audience, but has marginal quality and, because several colors are filtered from the content, results in poor color quality, similar to a black and white movie.

More recently, personal headsets have been made that have two separate miniature displays, one for each eye. In such, left content is presented on the display viewed by the left eye and right content is presented on the display viewed by the right eye. Such systems work well, but require a complete display system for each viewer.

Similar to this, Eclipse methods uses a common display, such as a television, along with personal eyewear that have fast-response shutters over each eye. In such, the left eye shutter is open allowing light to pass, the right eye shutter is closed blocking light and the television displays left-eye content, therefore permitting the light (image) from the television to reach the left eye. This is alternated with closing of the left eye shutter, opening of the right eye shutter and displaying right-eye content the television. By alternating faster than the typical human response time, the display appears continuous and flicker-free.

The problem with the latter two methods is that the three-dimensional content must be encoded on, for example, a disk and decoded by a player that switches between left/right eye content in synchronization with the left-eye and right-eye shutter. With such, one cannot connect an industry standard player (e.g. BlueRay or DVD) to an industry standard television (e.g., Plasma or LCD television) and watch three-dimensional content with a set of three-dimensional eyewear.

What is needed is a three-dimensional presentation system that utilizes existing, industry standard media delivery devices and provides three-dimensional viewing.

SUMMARY

Digital video content is encoded such that an encoded frame or sequence of encoded frames is used to encode an indicator of whether the subsequent frame or frames is/are intended for the left eye or intended for the right eye. For example, using two marker frames, a first marker frame having all black pixel values and the a second marker frame having all white pixel values, an exemplary sequence of three-dimensional video content is: first marker frame; second marker frame, left content frame-1, left content frame-2, second marker frame, first marker frame, right content frame-1, right content frame-2, first marker frame; second marker frame, left content frame-3, etc. Detection hardware detects the all-black then all white sequence and opens the left-eye shutter and detects the all-white then all-black sequence and opens the right-eye shutter.

To reduce the required number of marker frame or marker frame sequences, the detection hardware preferably includes a timing circuit that locks onto the marker frame or marker frame sequence and then anticipates alteration between future left-eye frames and right-eye frames. For example, in a frame sequence of: first marker frame, second marker frame, left content frame-1, second marker frame, first marker frame, right content frame-1, first marker frame, second marker frame, left content frame-2, right content frame-2, left content frame-3, right content frame-3, first marker frame, second marker frame, left content frame-4, second marker frame, first marker frame, right content frame-4, etc, the detection hardware detects the all-black then all-white sequence and the all-white then all-black sequence and determines the frame timing, thereafter timing the shutter system to alternate at appropriate points in time synchronized to the display of the corresponding content frames.

In another example, the marker frame(s) are used to establish timing. For example, first marker frame, second marker frame, first marker frame, left content frame-1, right content frame-1, left content frame-2, right content frame-2, left content frame-3, right content frame-3, first marker frame, second marker frame, first marker frame, left content frame-4, right content frame-4, etc. In this sequence, the detection hardware detects the all-black then all-white sequence then all-black sequence and determines the frame timing, opening the left eye shutter for the next frame timing (e.g. while the left content frame-1 is displayed) then opening the right eye shutter for the next frame timing (e.g. while the right content frame-1 is displayed), etc.

In a system not equipped to view three-dimensional content, the marker frames are ignored and the left content and right content frames result in a slight blurring of the image.

A standard content delivery mechanism (e.g. Internet, cable, fiber-optic, DVD, BlueRay) delivers the content to a standard television. A detector is interfaced to or integrated within eyewear to detect the marker frames and provide synchronization to shutters of three-dimensional eyewear. The marker frame or marker frame sequence is any detectable frame or frames including a set or sets of pixels.

In one embodiment, a three-dimensional eyewear synchronization system is disclosed. The three-dimensional eyewear synchronization system interfaces to a television that has a display. The television displays a sequence of frames of a three-dimensional program. The frames include left-eye frames, right-eye frames and synchronization frames. Three-dimensional eyewear has a shutter system for alternating image viewing to each eye of a wearer. The three-dimensional eyewear detects the synchronization frames and synchronizes the shutter system to the synchronization frames such that a left-eye shutter of the shutter system is open when left-eye frames are displayed on the display and a right-eye shutter of the shutter system is open when the right-eye frames are displayed on the display.

In another embodiment, a method of synchronizing three-dimensional eyewear to a television is disclosed including receiving light receiving light from a display screen of the television and extracting a synchronization signal from the light. The synchronization signal is transmitted to the three-dimensional eyewear where it is used in shuttering at least one shutter of the three-dimensional eyewear in synchronization with the synchronization signal.

In another embodiment, a three-dimensional eyewear synchronization system is disclosed including a television that has a display. A device detects a specific set of changes of light from the display and converts the changes of light into a synchronization signal. The synchronization signal is transmitted to eyewear having a mechanism for shuttering light from the display to each eye of a user. The eyewear receives the synchronization signal and uses the synchronization signal to time shuttering of the light from the display alternately to each of the eyes.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
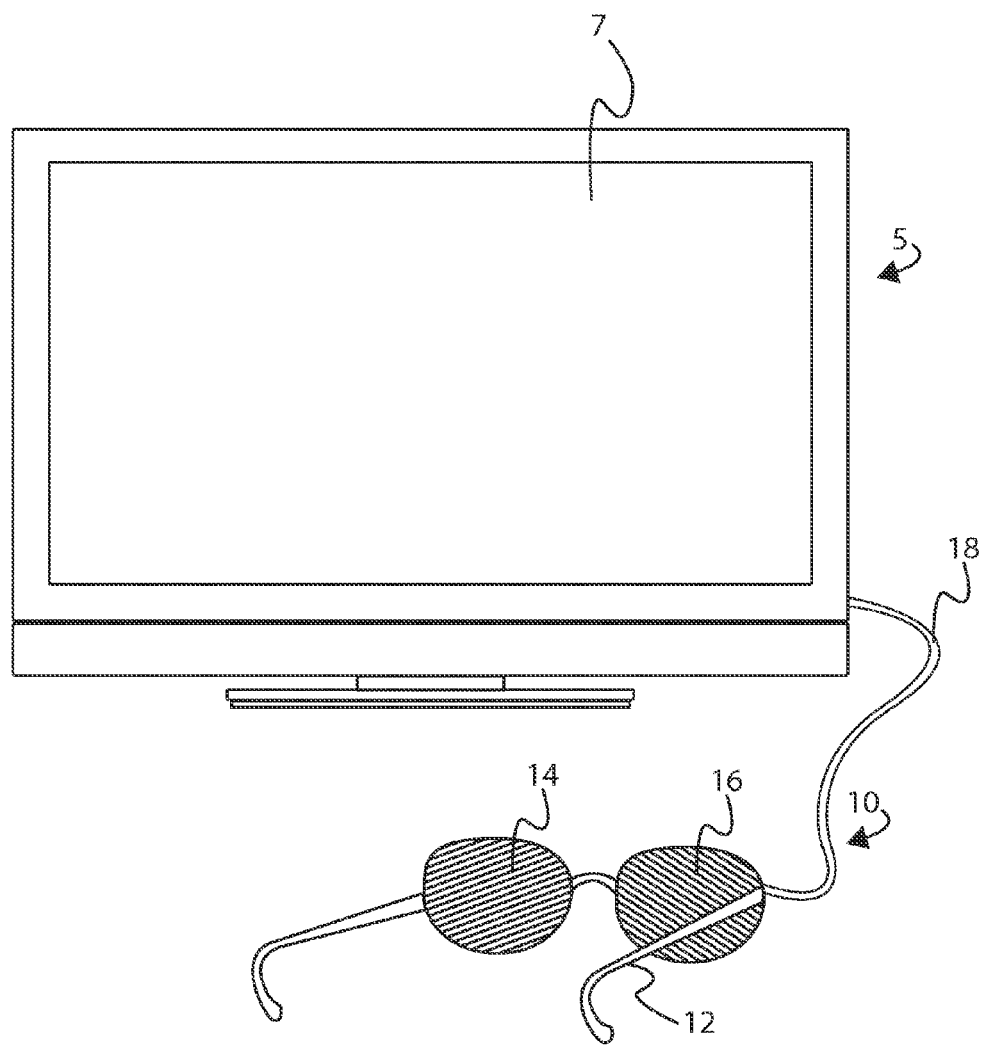
FIG. 1 illustrates a plan view of a television and three-dimensional eyewear of the prior art.

Reference will now be made in detail to the presently preferred embodiments of the invention, examples of which are illustrated in the accompanying drawings. Throughout the following detailed description, the same reference numerals refer to the same elements in all figures. The bezel of the present invention is the facing surface surrounding an image producing surface such as an LCD panel, CRT, Plasma panel, OLED panel and the like.

Referring to FIG. 1, a plan view of a television and three-dimensional eyewear of the prior art is described. In prior technology, three-dimensional eyewear 10 functioned with specialized content delivery hardware, such a personal computer or specially equipped television 5. The personal computer or television 5 displays three-dimensional content on a display 7 and controls the eyewear 10 through a cable 18 that provided control of each eye shutter 14/16, synchronizing the eye shutters 14/16 to the content being displayed on the display 7. The eyewear often includes frames with ear rests 12. In such systems, specialized content is usually required containing left-eye and right-eye encoded frames. Specialized hardware and/or software is also required in the personal computer or television 5 to properly display the content and synchronize operation of the left/right shutter with the display of the content.

It is advantageous to utilize existing content delivery mechanisms (e.g. Internet delivery, DVD disks, BlueRay disks, etc) and existing display technology (e.g. monitors, televisions, etc) without modification, The prior art does not provide for such.

Figure 2:
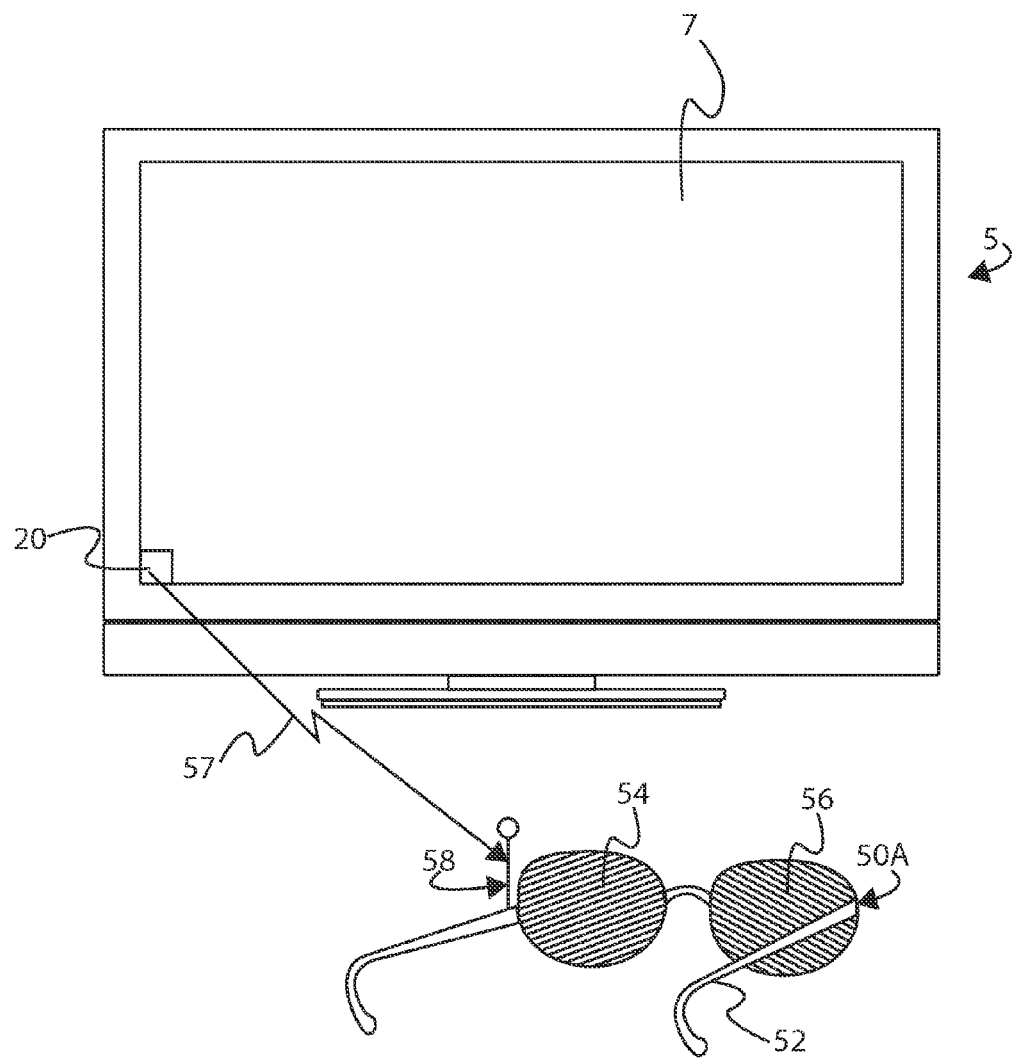
FIG. 2 illustrates a plan view of a television and a first embodiment of three-dimensional eyewear.

Referring to FIG. 2, a plan view of a display device (e.g. television) 5 and a first embodiment of three-dimensional eyewear 50A is described. In this, a transmitter device 20 is attached to cover a subset of the pixels of the display 7. As will be described, the transmitter 20 receives light from the subset of the pixels, detects a predetermined value of the light and generates a synchronization signal from the predetermined value of the light. The synchronization signal is transmitted to the three-dimensional eye wear 50A, in this example, by a radio frequency signal 57. For example, the synchronization signal is transmitted by a pre-determined frequency modulation, pulse code modulation, etc, as known in the industry. The radio frequency signal is received by an antenna 58 and decoded within the eyewear 50A or by an attached circuit to the eyewear 50A, controlling the eyewear shutters 54/56 as will be described. Note, in some embodiments, the eyewear 50A includes ear rests 52 for support.

Figure 3:
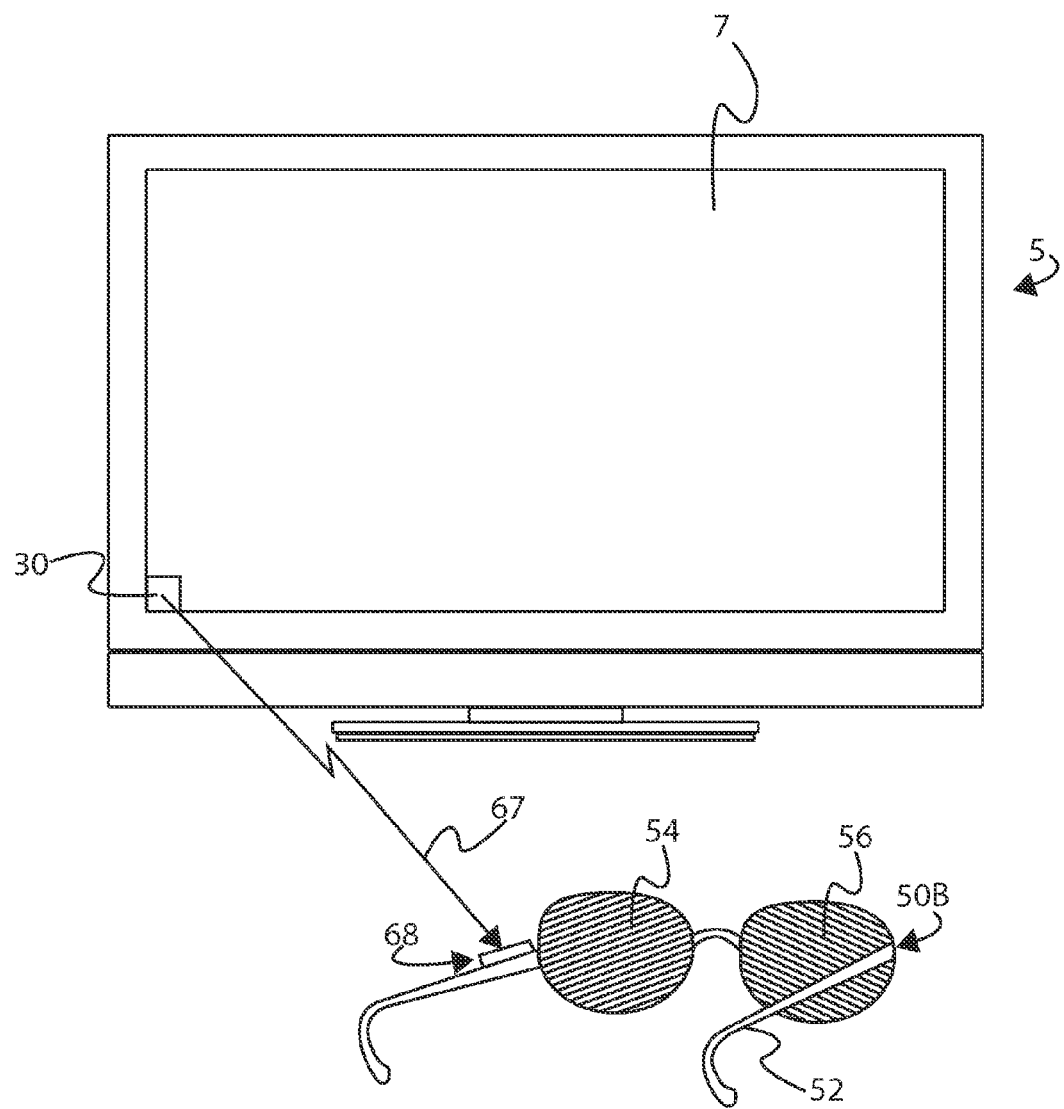
FIG. 3 illustrates a plan view of a television and a second embodiment of three-dimensional eyewear.
Figure 4:
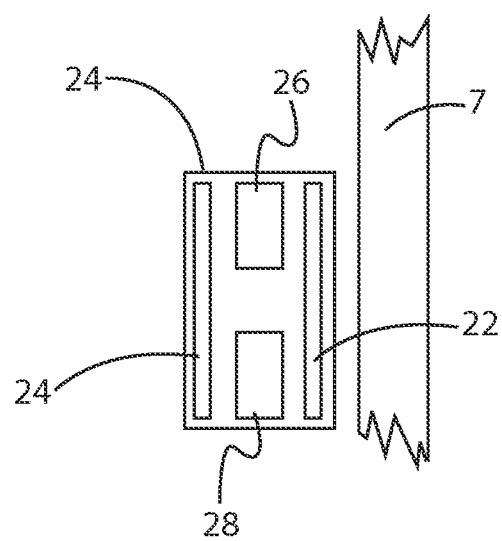
FIG. 4 illustrates a block diagram of a transmitter of the first embodiment of three-dimensional eyewear.

Referring to FIG. 3, a plan view of a television 5 and a second embodiment of three-dimensional eyewear 50B is described. In this, a transmitter device 30 is attached to cover a subset of the pixels of the display 7. As will be described, the transmitter 30 receives light from the subset of the pixels, detects a predetermined value of the light and generates a synchronization signal from the predetermined value of the light. The synchronization signal is transmitted to the three-dimensional eye wear 50B, in this example, by a light signal 67. For example, the synchronization signal is transmitted by a pre-determined modulated wavelength of light, preferably non-visible light such as Infra-red light, etc, as known in the industry. The modulated light signal 67 is received by a light detector 68 and decoded within the eyewear 50B or by an attached circuit to the eyewear 50B, controlling the eyewear shutters 54/56 as will be described. Note, in some embodiments, the eyewear 50B includes ear rests 52 for support Referring to FIG. 4, a block diagram of a transmitter 20 of the first embodiment of three-dimensional eyewear 50A is described. The transmitter 20 has a light detector 22 that interfaces to the display 7 over an area of the predetermined subset of pixels that convey the left-eye/right-eye synchronization signal. The light detector 22 receives light from the display 7 and converts it into an electrical signal and presents the electrical signal to a detection circuit 26 that analyzes the electrical signal to determine which pre-determined light value is being displayed on the predetermined subset of pixels and generates a synchronization signal based upon such. There are many encoding values for the left/right eye synchronization signal into a subset of pixels such as a first color for left and a second color for right, a first series of pixel color values for left and a second series of pixel colors for right, etc. As an example, all of the subset of pixels is red for left-eye content and black for right-eye content. The detector 26 then receives a first value of electrical signal for red light and a second value of the electrical signal for black (absence of light).

The synchronization signal is then modulated for transmission, in this example, using radio frequencies over an antenna 24. The modulation is any known modulation scheme. For example, a simple modulation scheme includes a carrier frequency and a signal frequency, wherein a left-eye signal is transmitted as the carrier frequency and the right-eye signal is transmitted as the signal frequency. Alternately, the left-eye signal consists of a first sequence of carrier frequency alternating with signal frequency and the right-eye signal consists of a second sequence of carrier frequency alternating with signal frequency. There are many known methods of transmitting a signal over radio frequencies, all of which are included here within.

The transmitter 20 has either an internal power source 28 (such as a battery or rechargeable capacitor; or has an external power source such as a wall-wart/brick (not shown).

Figure 5:
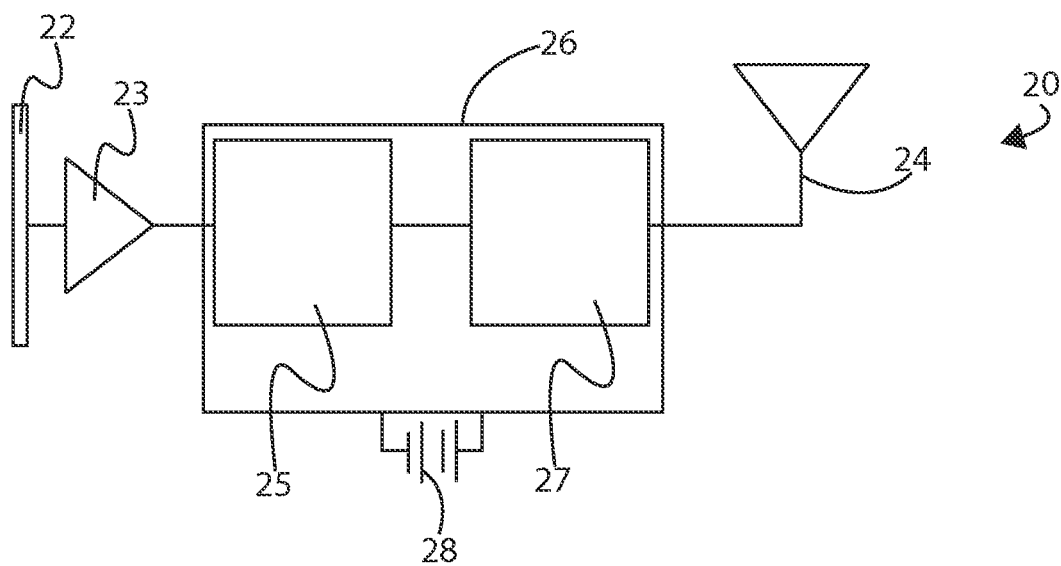
FIG. 5 illustrates a schematic view of a typical transmitter of the first embodiment of three-dimensional eyewear.

Referring to FIG. 5, a schematic view of a typical transmitter 20 of the first embodiment of three-dimensional eyewear system is described. The transmitter 20 has a light detector 22 that detects light from the display 7 and converts the light into an electrical signal which is amplified by an operational amplifier 23 and is presented to a detection circuit 26 that analyzes the electrical signal to determine which pre-determined light value is being displayed on the predetermined subset of pixels and generates a synchronization signal based upon such. The detection circuit has a decoder 25 that extracts the synchronization signal from the electrical signal. Any type of detection circuit is anticipated, including, but not limited to, counters, frequency high-pass and/or low-pass filters, etc. The synchronization signal is fed to a radio frequency modulator 27 that uses any known radio frequency modulation technique and the modulated radio frequency is transmitted by way of an antenna 24, which is preferable a solid-state, micro-miniature antenna, though any antenna is anticipated.

The transmitter is powered by a power source 28, as known in the industry, including, but not limited to batteries, rechargeable batteries, charged capacitors, wall bricks, etc. It is anticipated that the power source 28 be replaceable and/or rechargeable inside or outside of the transmitter 26. In some embodiments, light from the television display 7 is used to charge the power source 28.

Figure 6:
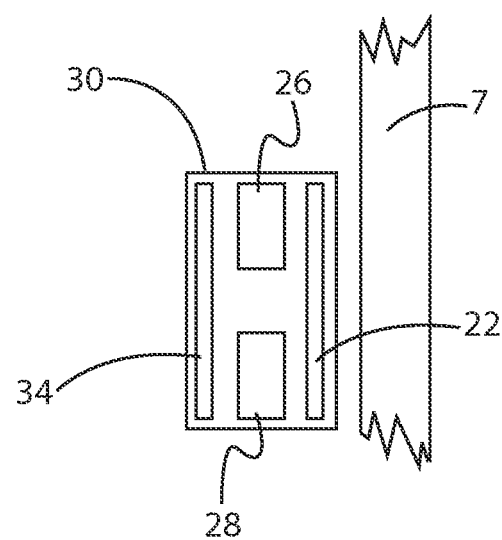
FIG. 6 illustrates a block diagram of a typical transmitter of the second embodiment of three-dimensional eyewear.

Referring to FIG. 6, a block diagram of a typical transmitter 30 of the second embodiment of three-dimensional eyewear is described. The transmitter 30 has a light detector 22 that interfaces to the display 7 over an area of the predetermined subset of pixels that convey the left-eye/right-eye synchronization signal. The light detector 22 receives light from the display 7 and converts it into an electrical signal and presents the electrical signal to a detection circuit 26 that analyzes the electrical signal to determine which pre-determined light value is being displayed on the predetermined subset of pixels and generates a synchronization signal based upon such. There are many encoding values for the left/right eye synchronization signal into a subset of pixels such as a first color for left and a second color for right, a first series of pixel color values for left and a second series of pixel colors for right, etc. As an example, all of the subset of pixels is red for left-eye content and black for right-eye content. The detector then receives one value of electrical signal for red light and a second value of the electrical signal for black (absence of light).

The synchronization signal is then modulated for transmission, in this example, using light waves emitted from a light output device 34 such as a light emitting diode (LED). The modulation is any known modulation scheme. For example, a simple modulation scheme includes modulation on/off of a light of a specific wavelength, preferably an invisible light such as infra-red light. In such, a left-eye signal is transmitted as a first on/off frequency or sequence of the light and the right-eye signal is transmitted as a second on/off frequency of the light. There are many known methods of transmitting a signal utilizing one or more wavelengths of light, all of which are included here within.

Figure 7:
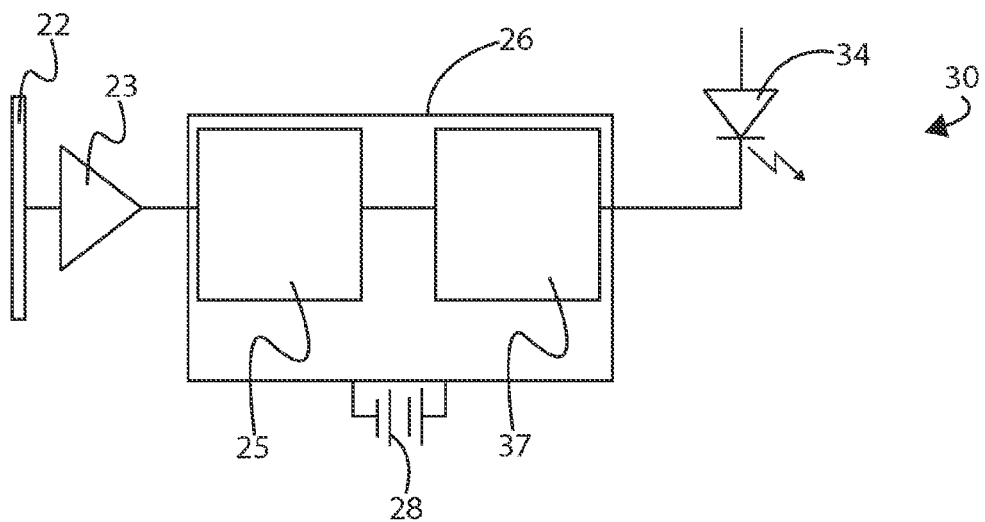
FIG. 7 illustrates a schematic view of a typical transmitter circuit of the second embodiment of three-dimensional eyewear.

Referring to FIG. 7, a schematic view of a typical transmitter circuit of the second embodiment of three-dimensional eyewear system is described. The transmitter 20 has a light detector 22 that detects light from the display 7 and converts the light into an electrical signal which is amplified by an operational amplifier 23 and is presented to a detection circuit 26 that analyzes the electrical signal to determine which pre-determined light value is being displayed on the predetermined subset of pixels and generates a synchronization signal based upon such. The detection circuit has a decoder 25 that extracts the synchronization signal from the electrical signal. Any type of detection circuit is anticipated, including, but not limited to, counters, frequency high-pass and/or low-pass filters, etc. The synchronization signal is fed to a light modulator 37 that uses any known light modulation technique and the modulated light is transmitted by way of light output device 34 which is preferable a light emitting diode 34, though any suitable light output device is anticipated.

The transmitter is powered by a power source 28, as known in the industry, including, but not limited to batteries, rechargeable batteries, charged capacitors, wall bricks, etc. It is anticipated that the power source 28 be replaceable and/or rechargeable inside or outside of the transmitter 26. In some embodiments, light from the television display 7 is used to charge the power source 28.

Figure 8:
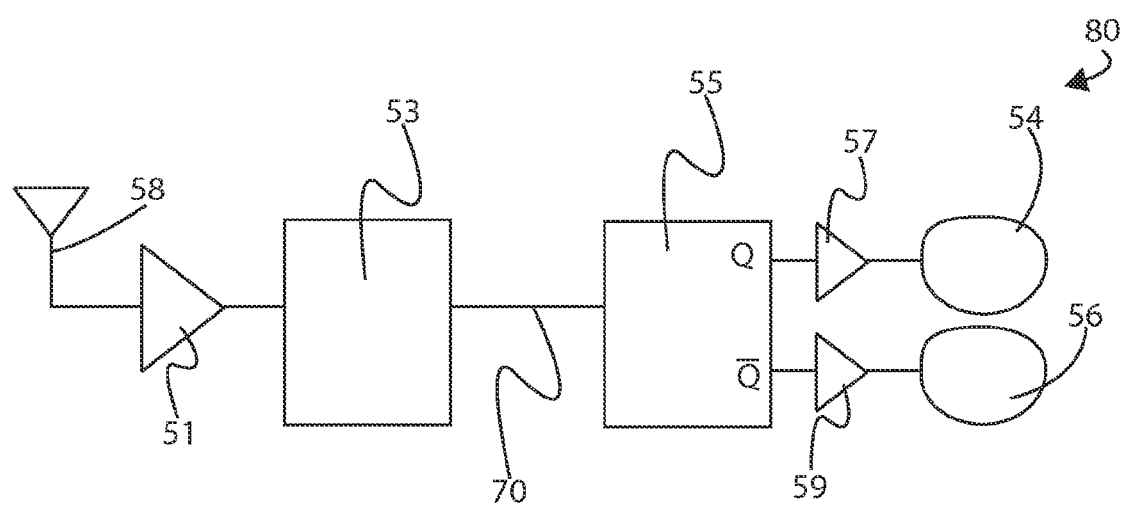
FIG. 8 illustrates a schematic diagram of a typical receiver circuit of the first embodiment of three-dimensional eyewear.

Referring to FIG. 8, a schematic diagram of a typical receiver circuit 80 of the first embodiment of three-dimensional eyewear 50A is described. In such, the radio frequency signal 57 is picked up by the antenna 58 and, optionally amplified by an operation amplifier 51 and detected/demodulated by a demodulator 53, recovering the transmitted synchronization signal 70. A timing circuit 55 translates the synchronization signal 70 into a left-eye (Q) control signal and a right-eye (-Q) and is coupled to the left-eye shutter 54 and right-eye shutter 56, respectively, by shutter drivers 57/59. In the preferred embodiment, the timing circuit 55 includes a phased-locked-loop that provides the left-eye and right-eye control signal during a loss of the shutter signal 70.

Figure 9:
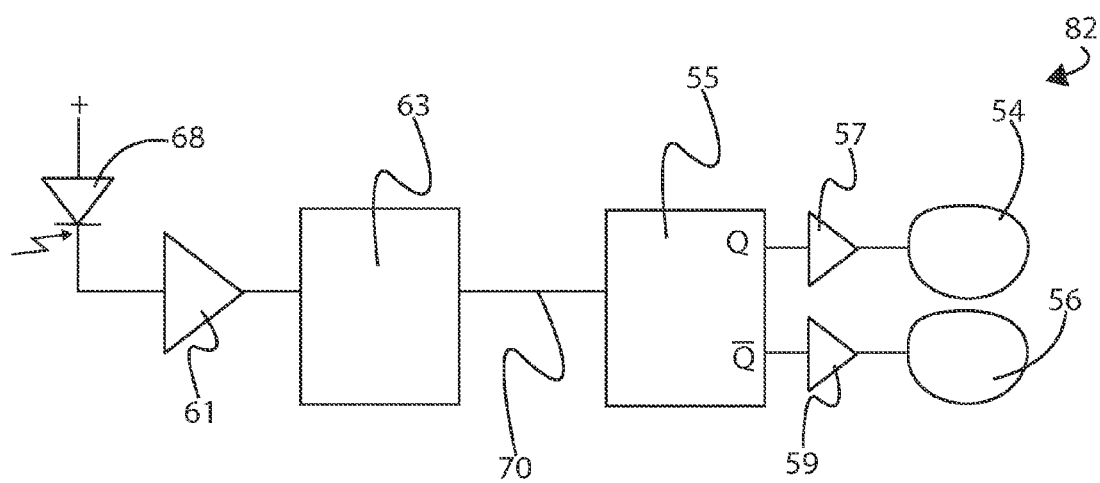
FIG. 9 illustrates a schematic view of a typical receiver of the second embodiment of three-dimensional eyewear.

Referring to FIG. 9, a schematic view of a typical receiver 82 of the second embodiment of three-dimensional eyewear 50B is described. In such, the light signal 67 is picked up by a light detector 68 (e.g., photo diode 68) and, optionally amplified by an operation amplifier 61 and detected/demodulated by a demodulator 63, recovering the transmitted synchronization signal 70. A timing circuit 55 translates the synchronization signal 70 into a left-eye (Q) control signal and a right-eye (-Q) and is coupled to the left-eye shutter 54 and right-eye shutter 56, respectively, by shutter drivers 57/59. In the preferred embodiment, the timing circuit includes a phased-locked-loop that provides the left-eye and right-eye control signal during a loss of the shutter signal 70.

Figure 10:
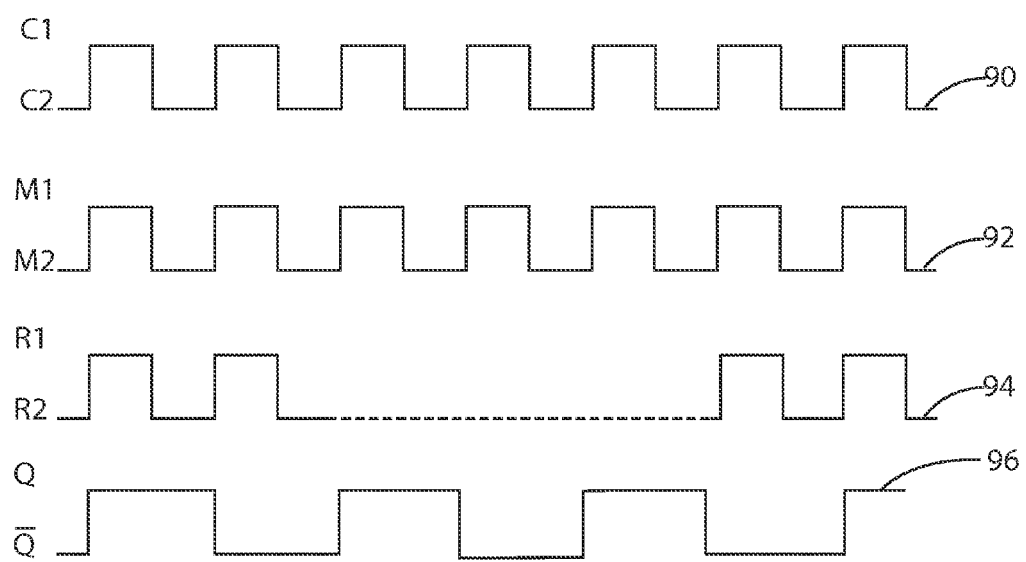
FIG. 10 illustrates a synchronization timing chart.

Referring to FIG. 10, an exemplary synchronization timing chart is described. In this example, the alternation of the eye shutters 54/56 is intended to occur during the leading edge transition. In other examples, the alternation is at the trailing edge or the open shutter 54/56 is dependent upon a specific signal level, frequency or voltage. It is anticipated that when non-three-dimensional content is displayed, either transmission is halted or a special transmission is made to signal the eyewear 50A/50B to open both shutters 54/56.

The first waveform 90 C1/C2 represents the signal from the subset of pixels of the television display 7. For exampled, C1 is represented by the subset of pixels being a first color and C2 is represented by the subset of pixels being a second color, for example, C1 is represented by white and C2 is represented by black. Many other representations are anticipated. The second waveform 92 M1/M2 is the output of the modulator 27/37. M1 represents a high value of the synchronization signal while M2 represents a low value of the synchronization signal. As an example, M1 is represented by an infrared light output modulated at 100 Khz and M2 is the infrared light output modulated at 125 Khz. Many representations of the synchronization signal are anticipated.

The third waveform 94 R1/R2 represents the received synchronization signal at the eyewear 50A/50B and the fourth waveform 96 Q/-Q represents control signals to the left and right shutter, respectively. In this example, the left shutter is open and the right shutter is closed when Q is zero (-Q is one). At each leading edge of the synchronization signal, Q/-Q is reversed, thereby opening the shutter 54/56 for the other eye. When reception of the synchronization signal is lost as indicated by a suspension of R1/R2, the internal timing circuit 55 (e.g. phase locked loop) attempts to continue the timing of the shutters 54/56 based on an internal clock such as a crystal-controlled oscillator. Since the internal clock does not accurately track the synchronization signal, the internal timing eventually drifts slightly until reception of the synchronization signal restarts, at which time the internal timing circuit again locks to the received synchronization signal. The loss of the received synchronization signal occurs when, for example, the light transmission is blocked or the radio frequency transmission is scrambled by interference.

Figure 11:
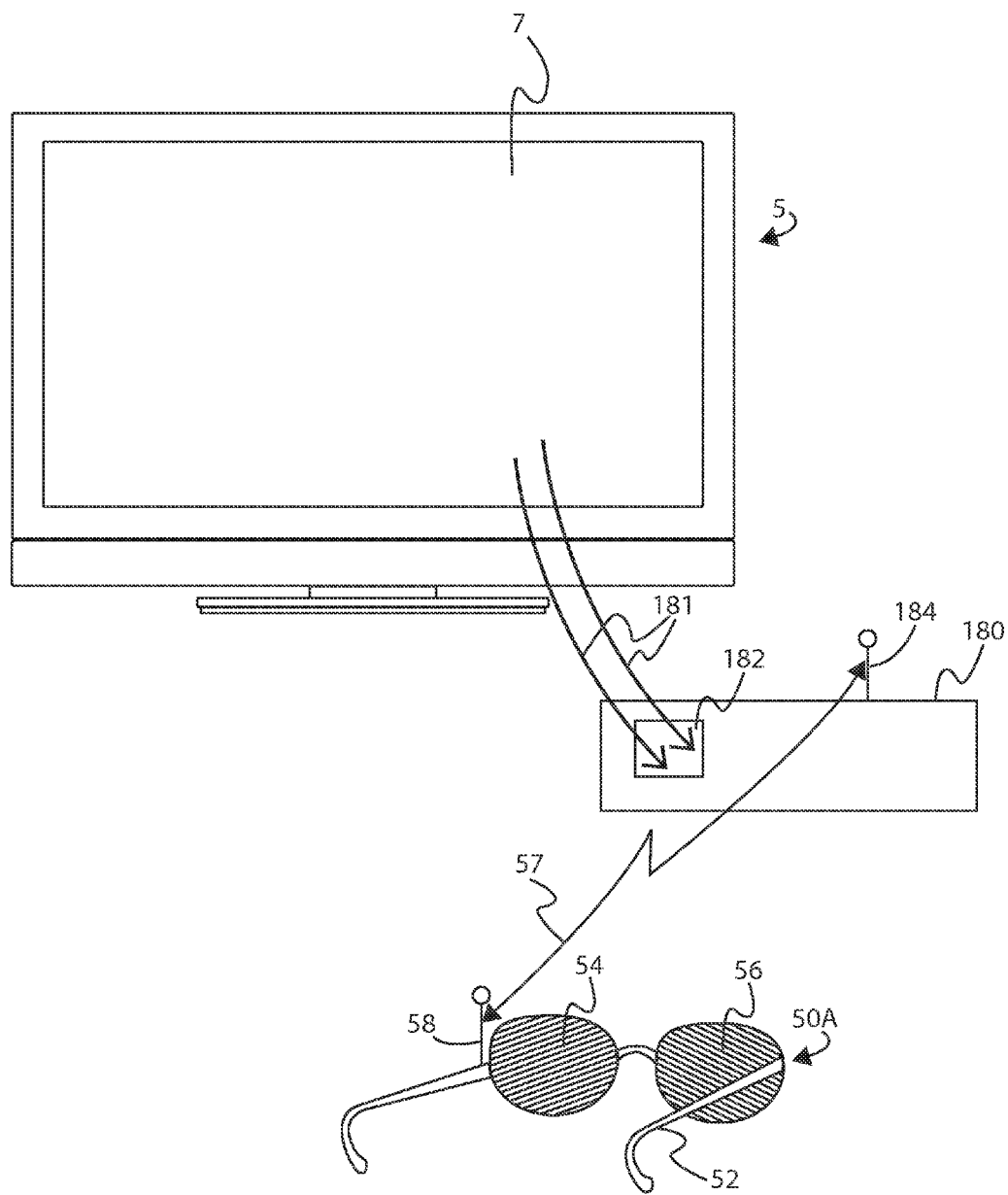
FIG. 11 illustrates a block diagram of a third embodiment.
Figure 12:
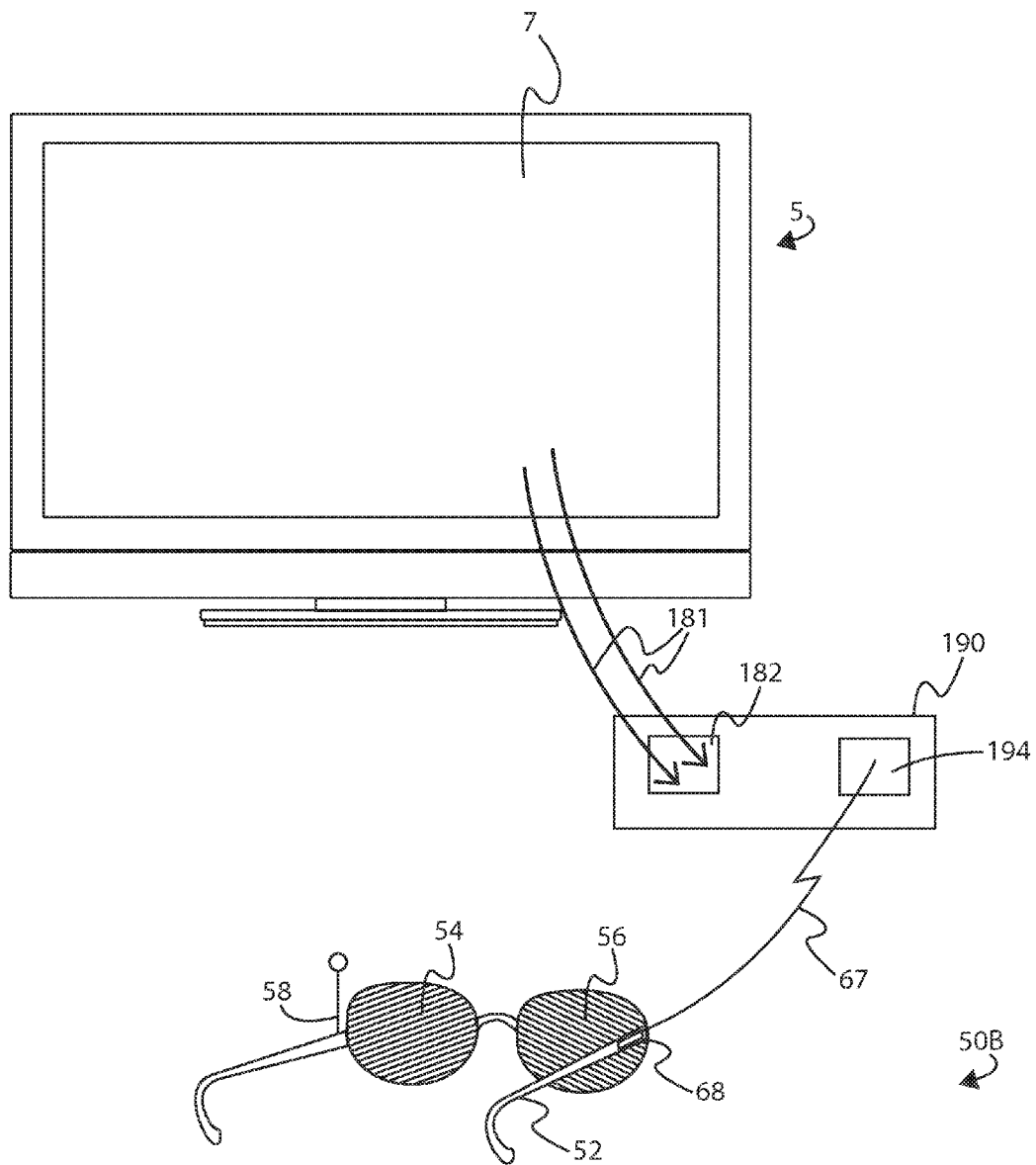
FIG. 12 illustrates a block diagram of a fourth embodiment.

Referring to FIGS. 11-12, a block diagram of a third and fourth embodiments are described. In this, the display 7 of the standard television 7 periodically emits a light synchronization signal 181 that is received by a light detector 182 that is part of synchronization detector 180/190. The synchronization signal is any alteration of the display 7 output such as a white frame followed by a black frame followed by a white frame. In some embodiments when the television systems 5 uses a scanning technique (e.g. cathode-ray tube television systems 5), the synchronization signal is a certain sequence of pixel brightness. For example, B represents a black pixel, W represents a white pixel, and one possible sequence is BWB-WWBWB. It is preferred that the light synchronization signal 182 is rarely a normal part of any typical television viewing (e.g., the sequence would not normally appear as a feature of any particular content), so as to not produce false synchronization signals. In some embodiments, the light detector 182 is a camera 182 (e.g. CCD camera) and the light detector 182 detects a pattern within a frame such as a pre-determined geometric pattern.

The synchronization detector 180/190 relays the detected synchronization signal to the eyewear 50A/50B (see FIGS. 2 and 3) either by a radio frequency signal 57 (FIG. 11) or a light wave signal 67 (FIG. 12). The radio frequency signal 57 is emitted on an antenna 184 (either internal or external) and received at the eyewear 50A at an antennal 58. If a light wave 67 is used, the light wave 67 is emitted by a light output device 194 (e.g., LED) and received at the eyewear 50B by a light detector 68 (e.g. photodiode 68). The eyewear 50A/50B then operates as previously described.

Figure 13:
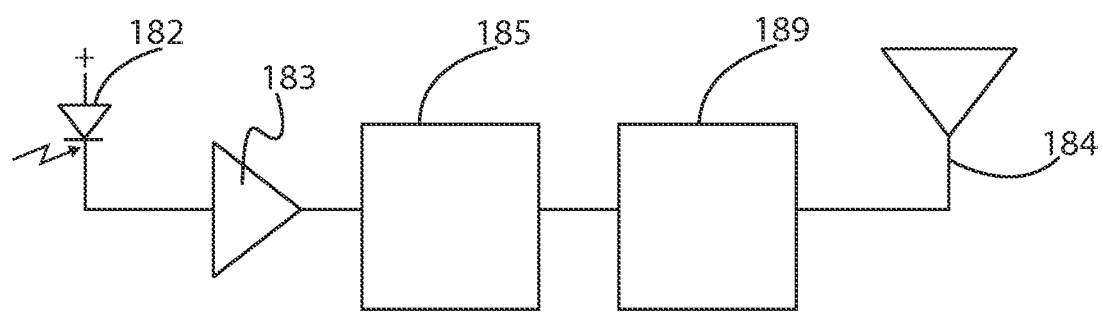
FIG. 13 illustrates a schematic diagram of the third embodiment.
Figure 14:
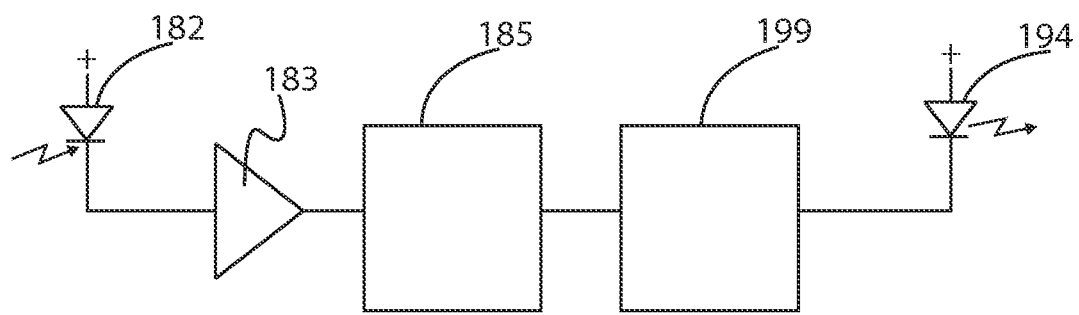
FIG. 14 illustrates a schematic diagram of the fourth embodiment.

Referring to FIGS. 13 and 14, schematic diagrams of the third and fourth embodiments are described. The light synchronization signal 181 is received by a light detector 182 (e.g. photo diode or camera) of the synchronization detector 180/190. The light synchronization signal 181 is any alteration of the display 7 output as described above. The output of the light detector 182 is, optionally amplified by amplifier 183 and then is detected by a detector 185. The detector 185 looks for the display output fluctuation that indicates synchronization such as a white-frame, black-frame then white-frame sequence. The detector 185 relays the detected signal to a radio frequency modulator 189 (as in FIG. 13) or a light modulator 199 (as in FIG. 14) for transmission to the eyewear 50A/50B. The radio frequency modulator 189 outputs a radio frequency signal onto an antenna 184 as known in the industry. The light modulator 199 drives an output device 194 such as a light emitting diode 194, preferably an LED 194 that emits invisible light such as infrared light.

Figure 15:
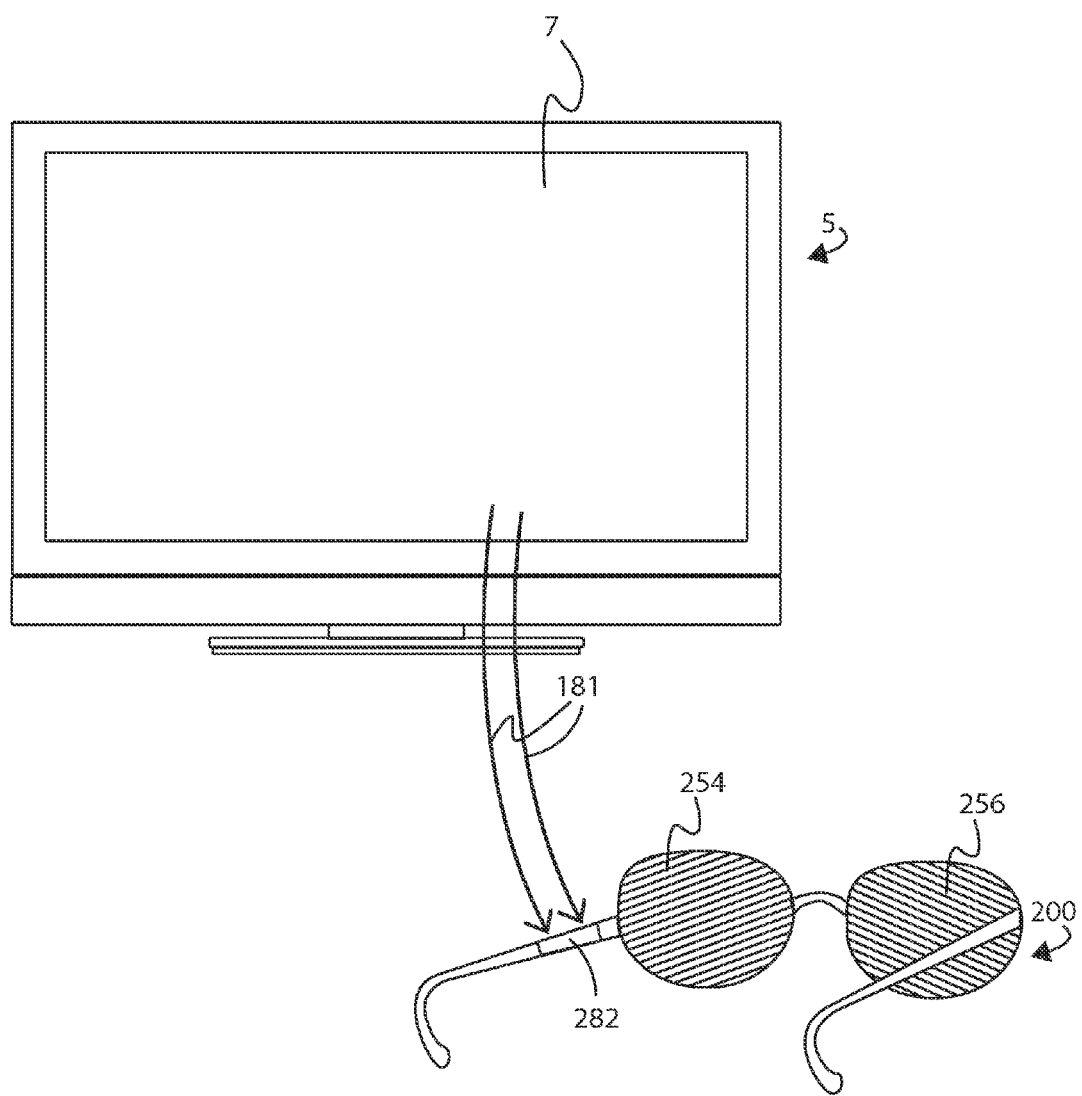
FIG. 15 illustrates a block diagram of a fifth embodiment.
Figure 16:
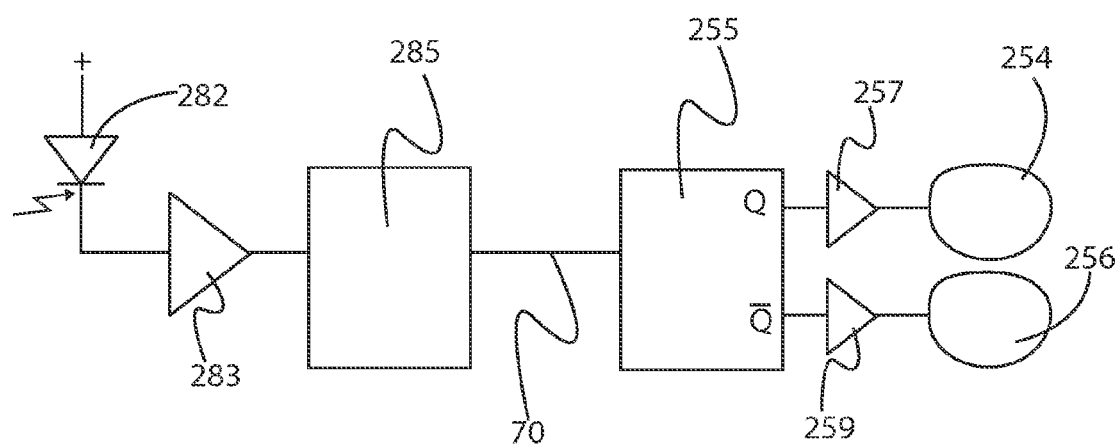
FIG. 16 illustrates a schematic diagram of the fifth embodiment.

Referring to FIGS. 15 and 16, a block diagram and schematic diagram of the fifth embodiment is described. In this, the display 7 of the standard television 7 periodically emits a light synchronization signal 181 that is received by a light detector 282 that is part of the three-dimensional eyewear 200. The light synchronization signal is as before any alteration of the display 7 output such as a white frame followed by a black frame followed by a white frame. In some embodiments when the television systems 5 uses a scanning technique (e.g. cathode-ray tube television systems 5), the light synchronization signal is a certain sequence of pixel brightness. For example, B represents a black pixel, W represents a white pixel, and one possible sequence is BBWWBBWWB-BWWBB. It is preferred that the light synchronization signal is rarely a normal part of any typical television viewing (e.g., the sequence would not normally appear as a feature of any particular content), so as to not produce false light synchronization signals 181.

The light synchronization signal 181 is converted to an electrical signal by the light detector 282 (photo diode, camera, etc) and, optionally, amplified by an amplifier 283 then presented to a detector 285. The detector 285 looks for the sequence of alteration of display output and develops a synchronization signal 70. The synchronization signal 70 is fed to the timing circuit 255 which uses the synchronization signal 70 to control the shutters 254/256 through, for example, shutter drivers 257/259. In the preferred embodiment, the timing circuit 255 includes a phase-locked-loop for continued operation of the shutters 254/256 during loss of the light synchronization signal 181.

Figure 17:
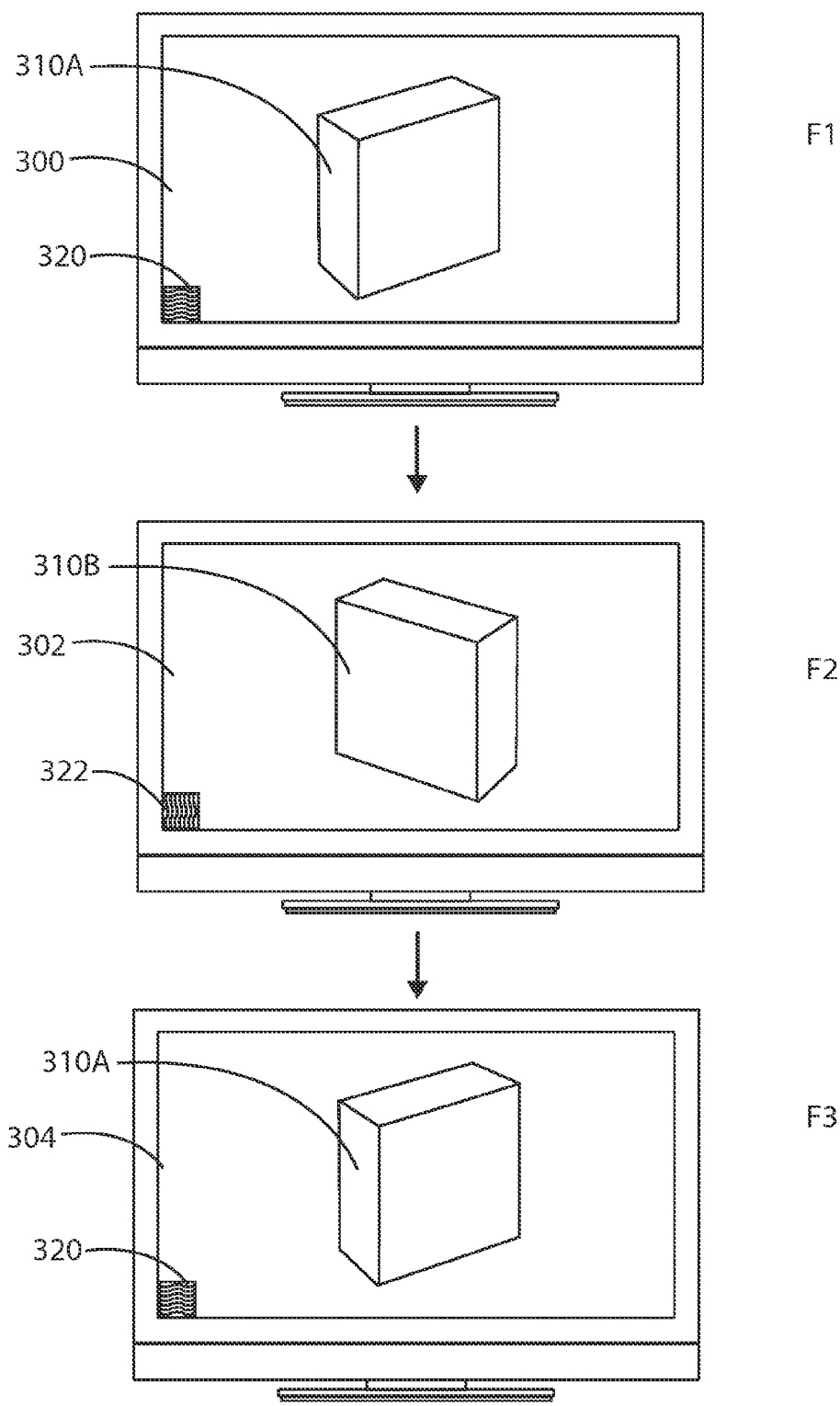
FIG. 17 illustrates a sequence of frames according to a first transmission arrangement.

Referring to FIG. 17, a sequence of displayed frames according to a first transmission arrangement is described. This is an exaggeration of what the left eye (frames F1 and F3) and the right eye (frame F2) sees from a three-dimensional perspective. As depicted, in three-dimensional perception, the left eye sees the left side of the box 310A and the right eye sees the right side of the box 310B. In a true video transmission, the viewing angle would be much less than that in this exaggerated view. When frame F1 300 is displayed, the frame relationship indicator area has a first pattern 320. When frame F2 302 is displayed, the frame relationship indicator area has a second pattern 322. When frame F3 304 is displayed, the frame relationship indicator area has, again, the first pattern 320. The transmitter device 20/30, as described above, is optically coupled to the frame relationship indicator area and detects which pattern (first pattern 320 or second pattern 322) is present and generates the synchronization signal from this detection. As stated, the only requirement is that the first pattern 320 is in some way detectably different from the second pattern 322. For example, the first pattern 320 is a set of pixels in the shape of a 'V' colored white and the second pattern 322 is the same set of pixels in the shape of a 'V' colored blue. In this example, the detector looks for the color change between white and blue and back to white. To an observer, the frame relationship indicator area appears, in this example, as a light-blue 'V'. Note, only three frames 300/302/304 are shown from a sequence of many. Also note that, although two distinct patterns 320/322 are used in this example, it is anticipated that additional patterns/color changes are used for other synchronization purposes. For example, a first pattern 320 is a red 'V' indicating left-eye content is being displayed (e.g. open the left eye shutter) and the second pattern 322 is a blue 'V' indicating right-eye content is being displayed (e.g. open the right eye shutter) and a third pattern (not shown) is a purple 'V' (red+blue) indicating that two dimensional frames are being displayed, or both-eye content (e.g. open both the left eye shutter and the right eye shutter).

Figure 18:
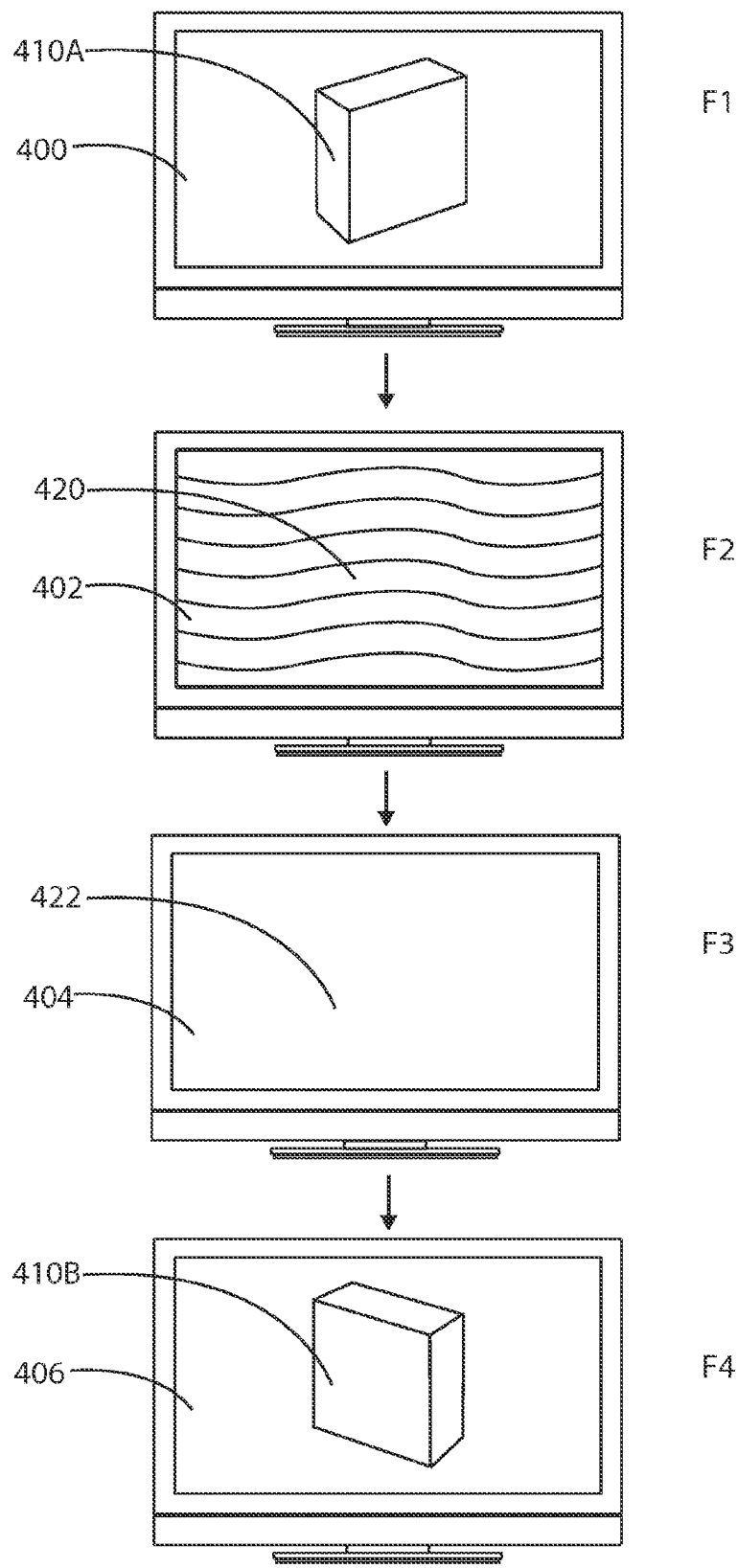
FIG. 18 illustrates a sequence of frames according to a second transmission arrangement.

Referring to FIG. 18, a sequence of displayed frames according to a second transmission arrangement is described. In this example, the change from left-eye frames 400 to right eye frames 406 is signaled by right eye marker frames 402/404. The frame depictions are an exaggeration of what the left eye (frame F1) and the right eye (frame F4) sees from a three-dimensional perspective. As depicted, in three-dimensional perception, the left eye sees the left side of the box 410A and the right eye sees the right side of the box 410B. In a true video transmission, the viewing angle would be much less than that in this exaggerated view. Also, in a true display of video, there would be many more frames displayed in sequence.

The sequence includes content frames F1 400 and F4 406 and marker sets F2 402 and F3 404. The marker sets 402/404 consist of one or more frames. For example, a marker set includes two frames displayed for one frame-time each (e.g. 33 milliseconds per frame at a 30 frames per second rate). The content of the marker sets 402/404 vary enough to be detectable by the detection circuit 185/285 but are preferably not easily detected by the human eye. In one example, the marker set includes a first marker frame 402 that is an all-black frame (all black pixels) and the second marker frame 404 is an all-white frame (all white pixels). In another example, the first marker frame 402 is a slightly dimmer copy of the left-eye content frame 400 and the second signaling frame is a slightly brighter left-eye content frame 400, thereby reducing any noticeable content modification. Although two signaling frames 402/404 are shown, any number is anticipated. For example, to switch from a left-eye frame 400 to a right-eye frame 406, the right-eye marker set displayed is a single brighter left-eye frame. The right-eye marker is displayed before the right-eye content frame 406. The detector 185/285 then detects the increase in brightness to open the right shutter 256 and close the left shutter 254. To switch from a right-eye view 406 to the left-eye view 400, a left-eye marker set is displayed and in this example, the left-eye marker set is a single dimmer right-eye frame. The detector 185/285 then detects the decrease in brightness to open the left shutter 254 and close the right shutter 256. Therefore, the detector 185/285 detects the brightness increase to synchronize the opening of the right shutter and closing of the left shutter and the detector 185/285 detects the brightness decrease to synchronize the opening of the left shutter and closing of the right shutter. For content that is for both eyes, a both-eye marker set is used. For example, a both-eye marker set occurs before one or more frames that are not in three-dimensions. The both-eye marker set is detectably different from the left-eye marker set and detectably different from the right-eye marker set. For example, the both-eye marker set includes three sequential frames, the first and third frames being black frames 402 and the intermediate frame being white 404. There are many examples of detectably different frames and detectably different sequences of frames or frame sets. In embodiments in which the detector includes a camera, the camera detects a pattern of pixels and therefore, each marker set has a single frame containing a distinguishable set of pixels such as icons or other sets of pixels.

Figure 19:
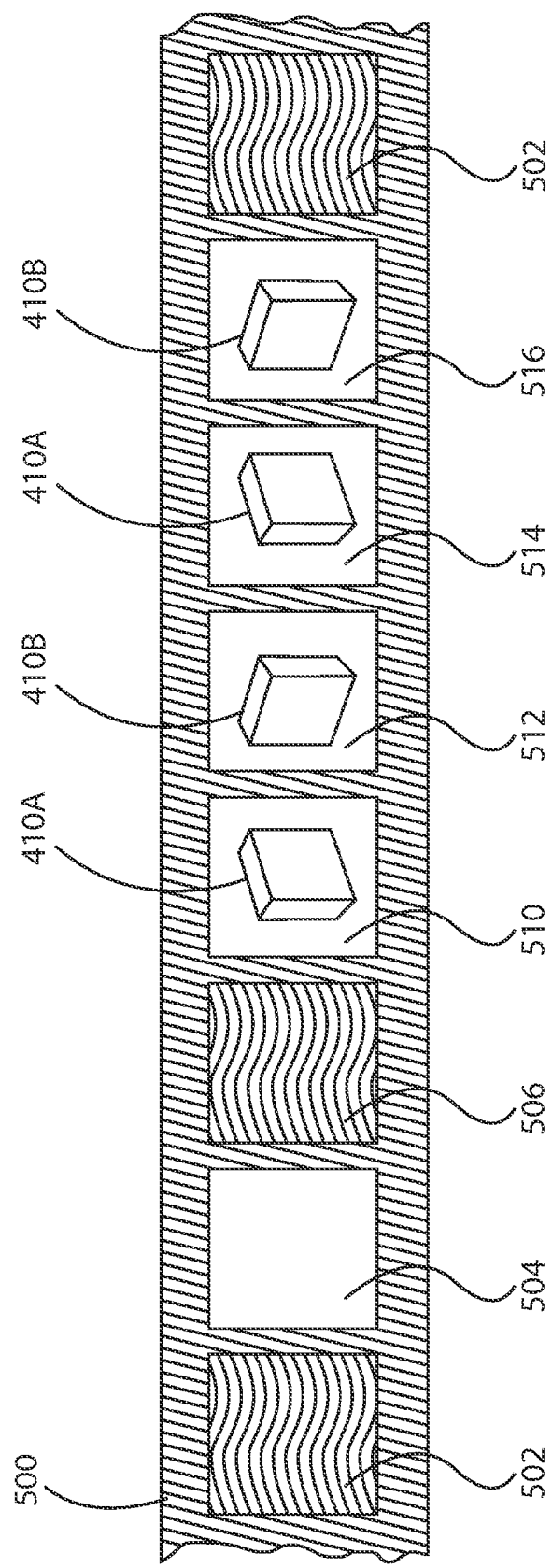
FIG. 19 illustrates an exemplary sequence of displayed frames according to a second transmission arrangement.

Referring to FIG. 19, an exemplary sequence of displayed frames according to a second transmission arrangement is described. In this example, a synchronization sequence of one or more marker frames, in this example three marker frames 502/504/506, is followed by a sequence of left and right content frames 510/512/514/516 on a digital media 500 (e.g. DVD disk, Blueray disk, hard disk, memory, etc). The start of the next sequence is shown by the first marker frame 502 of the next sequence. The marker frames 502/504/506 indicate the start of a sequence of content 510/512/514/516. Although the synchronization sequence is any number of marker frames including one marker frame, the example of FIG. 19 shows three marker frames 502/504/506. As an example, the first 502 and third 506 marker frames have the same set of pixel values and the second marker frame 504 has a distinguishably different set of pixels. The sequence of left and right content frames 510/512/514/516 is of any predetermined sequence and length, four frames in length in this example. The detector 185/285 detects the marker frames 502/504/506 and measures the duration of the marker frames 502/504/506 to generate a synchronization signal. For example, by locking onto the time of first detecting (leading edge) each of the marker frames 502/504/506, a synchronization signal is determined that predicts when each transition between, for example, left-eye content frames 510/514 and right-eye content frames 512/516 will occur and, thereby, the shutters 54/254/56/256 are controlled to synchronize with the display of the corresponding content frame. To reduce drift caused by slight variations between clocks, synchronization sequences 502/504/506 are embedded in the three-dimensional content at fixed positions. In such, the receiver knows to expect a synchronization sequence 502/504/506 followed by a pre-determined sequence of left-eye content frames 510/514, right-eye content frames 512/516, followed by another synchronization sequence 502/504/506, etc. In examples in which the synchronization sequence is one marker frame, the detector determines the start of the marker frame and the duration of the marker frame. From that, it knows that the first content frame (e.g. left-eye content frame 510) follows immediately after the marker frame and then exactly one duration later is a second content frame (e.g. right-eye content frame 512), etc.

Figure 20:
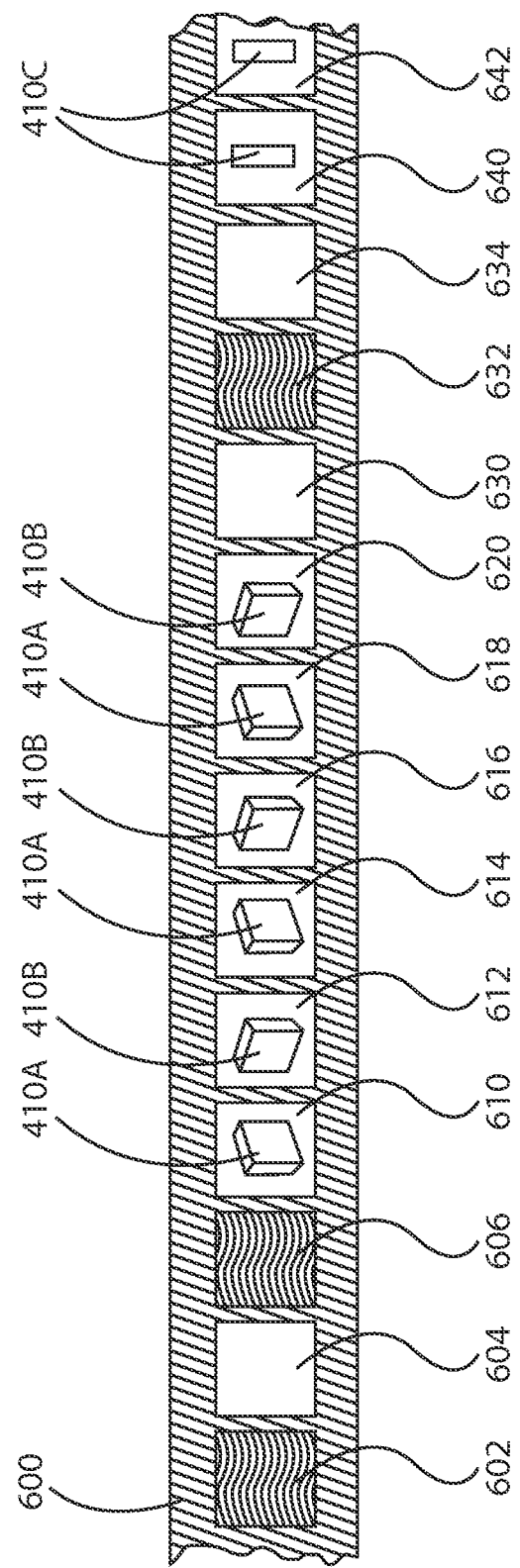
FIG. 20 illustrates a second exemplary sequence of displayed frames according to a second transmission arrangement.

Referring to FIG. 20, a second exemplary sequence of displayed frames according to a second transmission arrangement is described. In this example, a three-dimensional synchronization sequence 602/604/606 of one or more marker frames, in this example three marker frames 602/604/606, is followed by a sequence of left and right content frames 610/612/614/616/618/620 on a digital media 600 (e.g. DVD disk, Blueray disk, hard disk, memory, etc). After the three-dimensional content frames 610/612/614/616/618/620, the content is two-dimensional (e.g. both shutters 54/254/56/256 are open). The start of the two-dimensional, both-eye content frames is indicated by a different synchronization sequence 630/632/634 shown in this example by the second marker frame 630, followed by the first marker frame 632 followed by the second marker frame 634. The synchronization sequence 630/632/634 (marker frames 630/632/634) indicate a start of a sequence of both-eye content frames 640/642, etc 410C. Since there is no shutter operation during two-dimensional or both-eye content frames, there is no need to include further two-dimensional synchronization sequence 630/632/634, although additional two-dimensional synchronization sequence 630/632/634 are anticipated in case the first sequence is lost due to interference.

Although the two-dimensional synchronization sequence 630/632/634 and three-dimensional synchronization sequence 602/604/606 is any number of marker frames including one marker frame, the example of FIG. 20 shows three marker frames. As an example, in the three-dimensional synchronization sequence 602/604/606, the first 602 and third 606 marker frames have the same set of pixel values and the second marker frame 604 has a distinguishably different set of pixels. Similarly, in the two-dimensional synchronization sequence 630/632/634, the first 630 and third 634 marker frames have the same set of pixel values and the second marker frame 632 has a detectably distinguishably different set of pixels and also being detectably distinguishable from the three-dimensional synchronization sequence 602/604/606.

The sequence of left and right content frames 610/612/614/616/618/620 is of any predetermined sequence and length, six frames in length in this example. The detector 185/285 detects the three-dimensional marker frames 602/604/606 and measures the duration of the marker frames 602/604/606 to generate a synchronization signal. For example, by locking onto the time of first detecting (leading edge) each of the marker frames 602/604/606, a synchronization signal is determined that predicts when each transition between, for example, left-eye content frames 610/614/618 and right-eye content frames 612/616/620 will occur and, thereby, the shutters 54/254/56/256 are controlled to synchronize with the display of the corresponding content frame. To reduce drift caused by slight variations between clocks, synchronization sequences 602/604/606 are embedded in the three-dimensional content at fixed positions. In such, the receiver knows to expect a synchronization sequence 602/604/606 followed by a pre-determined sequence of left-eye content frames 610/614/618, right-eye content frames 612/616/620, followed by another synchronization sequence 602/604/606 (or a two-dimensional synchronization sequence 630/632/634), etc.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A three-dimensional eyewear synchronization system for attachment to a television, the three-dimensional eyewear comprising:

three-dimensional eyewear having a shutter system, the three dimensional eyewear receiving a sequence of frames of a three-dimensional program to be viewed via the eyewear, from the television, the frames including left-eye frames, right-eye frames and synchronization frames, the synchronization frames including a synchronization sequence formed of at least one marker frame having a specified duration, where said marker frame includes a modified version of content to be viewed by a user, where the marker frames include content whose brightness has been modified to indicate a first marker frame, said at least one marker frame, followed by content frames including both the left eye frames and the right eye frames, the three-dimensional eyewear alternating image viewing to each eye of a wearer, the three-dimensional eyewear detects the synchronization frames and synchronizes the shutter system to the synchronization frames such that both the left eye frames and right eye frames are synchronized using the first marker frame and such that a left-eye shutter of the shutter system is open when left-eye frames are displayed on the television and a right-eye shutter of the shutter system is open when the right-eye frames are displayed on the television and where the three-dimensional eyewear operates by determining a start of the first marker frame, determining a duration of the first marker frame, indicating that a first content frame which is one of the left eye frames and the right eye frames starts exactly the duration after the first marker frame, and determining that a second content frame, which is the other of the left eye frames and the right eye frames, starts exactly one frame duration after the first content frame.

2. The three-dimensional eyewear synchronization system of claim 1, further comprising a timing circuit within the three-dimensional eyewear, the timing circuit locks onto the synchronization frames and the timing circuit continues operation of the shutter system during absences of the synchronization frames.

3. The three-dimensional eyewear synchronization system of claim 2, wherein the timing circuit includes a phased-locked loop.

4. The three-dimensional eyewear synchronization system of claim 1, further comprising a television, the television having a display, displaying a sequence of frames of a three-dimensional program, the frames including left-eye frames, and right-eye frames and sending the synchronization frames to the eyewear.

5. The three-dimensional eyewear synchronization system of claim 1, wherein the synchronization frames include a first frame having a first set of pixel values and a second frame having a second set of pixel values and the first set of pixel values is detectably different from the second set of pixel values.

6. The three-dimensional eyewear synchronization system of claim 1, wherein each subsequence of frames of the three-dimensional program includes the synchronization frames followed by a predetermined number of pairs of left-eye frames followed by right-eye frames.

7. A method of synchronizing three-dimensional eyewear to a television, the method comprising:
receiving light from a display screen of the television including a sequence of marker frames, where said marker frames include a modified version of content to be viewed by a user, whose brightness has been modified to indicate a marker frame where the marker frames include a modified version of content that is not easily detected by a human eye;
extracting a synchronization signal from the light, receiving a sequence of frames of a three-dimensional program, the frames including left-eye frames, and right-eye frames, the synchronization signal including a synchronization sequence formed of a first marker frame having a specified duration, followed by content frames including the left eye frames and the right eye frames;
shuttering at least one shutter of the three-dimensional eyewear in synchronization with the synchronization signal by determining a start of the first marker frame, determining a duration of the first marker frame, indicating that a first content frame which is one of the left eye frames and the right eye frames starts exactly the duration after the first marker frame, and determining that a second content frame, which is the other of the left eye frames and the right eye frames, starts exactly one frame duration after the first content frame, such that both the left eye frames and right eye frames are synchronized using the first marker frame.

8. The method of claim 7, wherein the extracting includes detecting a specific sequence of light patterns from the display.

9. The method of claim 7, after the step of extracting, further comprising the step of locking onto the synchronization signal such that the shuttering continues during absences of the synchronization signal.

10. The method of claim 9, wherein the locking is performed by a phase-locked loop.

11. A three-dimensional eyewear synchronization system comprising:
a receiver that detects a specific set of changes of light from the display as marker frames, where said marker frames include a modified version content to be viewed by a user, where the content has been modified to indicate a marker frame, said at least one marker frame, and where the marker frames include content that is not easily detected by a human eye;
a converter that converts the changes of light into a synchronization signal by detecting a brightness increase to synchronize a first action, and detecting a brightness decrease to synchronize a second action;
eyewear having a display shutter for each eye of a user;
a display using the synchronization signal to time shutter the light from the display alternately to the each eye of the user, wherein the specific set of changes of light from the display is a result of the receiver receiving a sequence of said marker frames and wherein the marker frames are followed by a predetermined sequence of left-eye content frames and right-eye content frames, the three dimensional eyewear receiving a sequence of frames of a three-dimensional program, the frames including left-eye frames, right-eye frames and synchronization frames, the synchronization frames including a synchronization sequence formed of a marker frame having a specified duration, followed by content frames including the left eye frames and the right eye frames, the three-dimensional eyewear operates by determining a start of the marker frame, determining the duration of the marker frame, indicating that a first content frame which is one of the left eye frames and the right eye frames starts exactly the duration after the marker frame, and determining that a second content frame, which is the other of the left eye frames and the right eye frames, starts exactly one frame duration after the first content frame, such that both the left eye frames and right eye frames are synchronized using the first marker frame.

12. The three-dimensional eyewear synchronization system of claim 11, further comprising a means for locking onto the synchronization signal, thereby continuing operation of the means for shuttering in absence of the synchronization signal.

13. The three-dimensional eyewear synchronization system of claim 12, wherein the means for locking includes a phased-locked loop.

14. The three-dimensional eyewear synchronization system of claim 11, wherein the receiver uses a wireless signal.

15. The three-dimensional eyewear synchronization system of claim 14, wherein the wireless signal comprises Infrared light waves.

16. The three-dimensional eyewear synchronization system of claim 15, wherein the wireless signal comprises radio frequency waves.

17. The three-dimensional eyewear synchronization system of claim 11, further comprising a television, the television having a display; wherein the specific set of changes of light from the display is a result of the television displaying a sequence of marker frames.

18. The three-dimensional eyewear synchronization system of claim 17, wherein the marker frames are followed by a predetermined sequence of left-eye content frames and right-eye content frames.

* * * * *